United States Patent [19]
Aubry

[11] Patent Number: 6,152,692
[45] Date of Patent: Nov. 28, 2000

[54] ROTOR BLADE WITH SWIVELLING AIR FLOW CONTROL FLAP

[75] Inventor: Jacques Antoine Aubry, Cabries, France

[73] Assignee: Eurocopter, France

[21] Appl. No.: 09/185,984

[22] Filed: Nov. 4, 1998

[30] Foreign Application Priority Data

Nov. 7, 1997 [FR] France ................... 97-14036

[51] Int. Cl.[7] ....................... B64C 9/00
[52] U.S. Cl. .................... 416/24; 416/23; 244/75 R; 244/17.25
[58] Field of Search ............ 416/23, 24; 244/213, 244/214, 215, 75 R, 17.25

[56] References Cited

U.S. PATENT DOCUMENTS

| | | | |
|---|---|---|---|
| 4,426,911 | 1/1984 | Robinson et al. | 244/75 R |
| 4,431,148 | 2/1984 | Mouille | 244/17.25 |
| 5,314,308 | 5/1994 | Reed, III | 416/23 |
| 5,387,083 | 2/1995 | Larson et al. | 416/23 |
| 5,639,215 | 6/1997 | Yamakawa | 416/23 |
| 5,730,581 | 3/1998 | Buter | 416/23 |
| 5,884,872 | 3/1999 | Greenhalgh | 244/215 |

FOREIGN PATENT DOCUMENTS 2 299 562   10/1996   United Kingdom .

*Primary Examiner*—F. Daniel Lopez
*Assistant Examiner*—Richard Woo
*Attorney, Agent, or Firm*—Piper, Marbury, Rudnick & Wolfe

[57] ABSTRACT

The blade includes at least one trailing edge swivelling air flow control flap, swivelling on the blade around an axis directed substantially along the span of the blade and the control flap, the swivelling of the control flap being controlled by an actuator gear mounted on the blade and including an actuator. The actuator includes a first rotating motor, the rotational speed of which corresponds to a frequency of swivelling of the control flap, and a second rotating motor which moves relative to each other two eccentrics mounted in series around the shaft of the first motor, the second motor rotating with one of the eccentrics, and a ring freely rotating around the eccentrics is driven in movements transmitted by a flexible arm transmission to the control flap. The frequency and amplitude controls of the swivelling of the air flow control flap are thus separated.

18 Claims, 2 Drawing Sheets

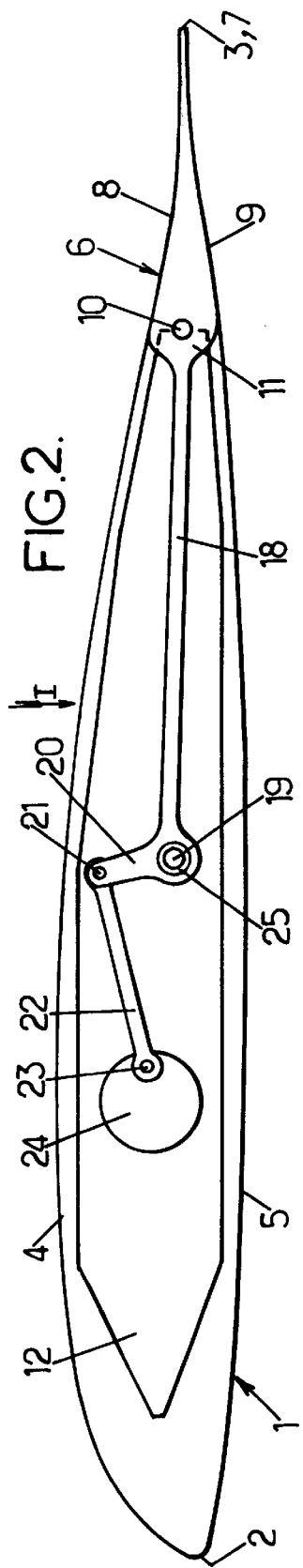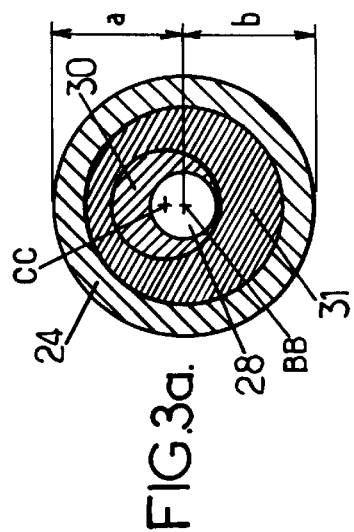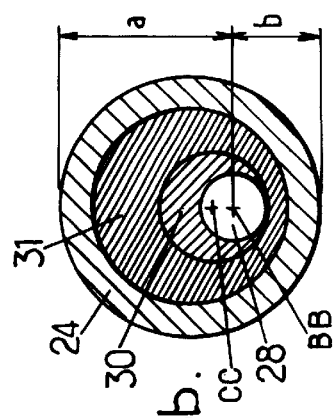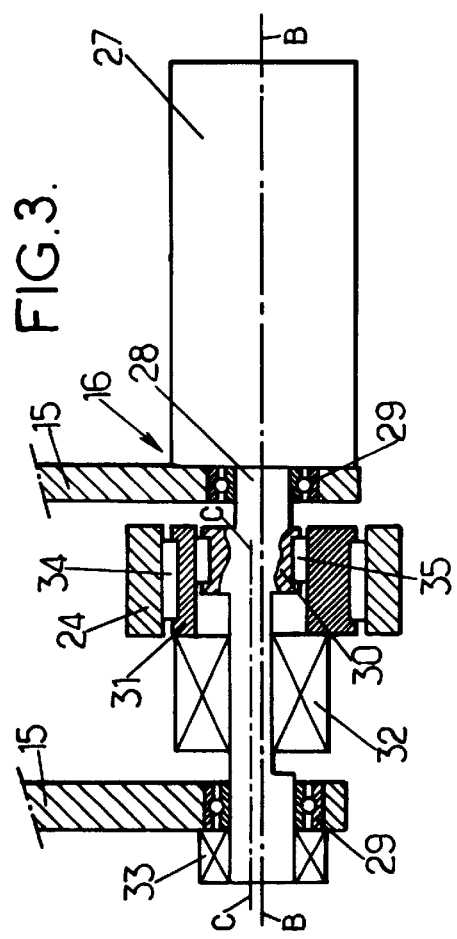

ROTOR BLADE WITH SWIVELLING AIR FLOW CONTROL FLAP

FIELD OF THE INVENTION

The invention concerns a rotor blade for a rotary wing aircraft rotor, in particular a main rotor, particularly for a helicopter.

BACKGROUND OF THE INVENTION

In order to improve the aerodynamic performance of a helicopter main rotor, and/or reduce the vibration level of the blades of such a rotor, and/or the noise emitted by the blades of a rotating rotor, it has already been proposed to superpose, on the standard cyclic pitch control of the blades, necessary for the control of a helicopter main rotor and for the attitude control of the helicopter, a multi-cyclic control, with a frequency a multiple of the rotational frequency of the rotor.

However, a multi-cyclic control requires substantial modification of the structure and the operation of the standard swash-plate devices, with which practically all helicopters are fitted for the control of the collective and cyclic pitch of the blades.

The problem at the basis of the invention is to propose an improved blade, intended for the fitting in particular to helicopter main rotors, and allowing these rotors to obtain approximately the same advantages as a multi-cyclic pitch control, without requiring modification of the structure and operating mode of a standard swash-plate pitch control device.

Another problem at the basis of the invention is to propose, for the operation of at least one trailing edge air flow control flap of a blade, an actuating assembly or actuator gear mounted on the blade and including, between at least one actuator of this gear and the control flap, a transmission of simple, economic, reliable structure occupying little space, and capable of being combined with different types of actuators.

BRIEF DESCRIPTION OF THE INVENTION

Generally speaking, an aim of the invention is to propose an improved blade allowing the improvement of the aerodynamic performance of the rotor, reduction of its vibration level and/or of the noise emitted, and which is better suited to the various demands of practice than currently known blades equipping helicopter main rotors.

To this end, the blade according to the invention, including at least one swivelling, or rotatable trailing edge air flow control flap, the control flap being pivoted on the blade, and more exactly in a blade part near the blade trailing edge, around at least one axis directed substantially along the span of the blade and the control flap, the swivelling of the control flap being controlled by an actuator gear, mounted on the blade, and including at least one actuator, is such that the actuator gear includes also means for separation of a frequency control and an amplitude control of the swivelling of this air flow control flap. Thus the swivelling of the air flow control flap can be optimised separately in frequency, on the one hand, and, on the other hand, in amplitude.

In this way, by the appropriate control of the actuator, and without utilising the swash-plate device, the air flow control flap can be rotated, which is then active, giving it a desired orientation, relative to the blade, this orientation being able to be varied as a function of numerous parameters, such as the azimuthal position of the blade around the rotor axis, its rotational speed, its angular pitch and/or flapping and/or drag movements, etc.

When the actuator is not operating, the control flap is passive and does not disrupt in a disadvantageous manner the operation of the blade when the aerodynamic profile of the control flap is in the extension of that of the blade.

To advantage, the actuator includes at least one first rotating motor, preferably electric, but also being able to be of another kind, and rotating at a rotational speed corresponding to a desired frequency of the swivelling of the air flow control flap in case of mono-frequency control, the rotational speed of the first motor being preferably adjustable in a speed range corresponding to a frequency range of the control flap swivelling, in order to optimise the operation of the control flap, without limitation of the frequency range.

In one advantageously simple, compact and easy to control embodiment, the actuating gear includes, for the purpose of separating the frequency and amplitude controls, two eccentrics in series, the second around the first, and the first eccentric of which is driven by a first rotating motor in rotation around the first motor axis, with a rotational speed corresponding to a base frequency of the control flap swivelling, and the second eccentric of which is centred on the axis of the first eccentric and controlled in angular position relative to the first eccentric and around the axis of the latter, for the amplitude control of the control flap swivelling, by at least one second rotating motor, rotating integrally with the first eccentric around the axis of the first motor, a ring being mounted to freely rotate on the second eccentric, and connected to the air flow control flap by a transmission transforming the ring movements by the eccentrics in swivelling movements of the air flow control flap, with an amplitude being a function of the eccentricities and of the relative position of the two eccentrics and being controlled by the second motor. The movable coupling constituted by the two eccentrics, by the second (amplitude control) motor, and by the external ring, is mounted on two bearings, plain or rolling bearings, along the axis of the first motor. Preferably, the transmission between the ring and the air flow control flap is a flexible arm transmission according to the invention, such as presented below.

With advantage, the second rotating motor is an electric motor supplied with current through a rotating commutator mounted around an output shaft of the first motor, or axis of the movable coupling.

This second motor can be a position controlled stepper motor, so as to control the swivelling of the air flow control flap with variable amplitude by steps on a turn of the rotor, but it is also possible for this second motor to be a lockable motor, if the swivelling of the air flow control flap is to be controlled with constant amplitude.

As a variant, the first motor can drive the first eccentric with a rotational speed corresponding to the base frequency of the control flap swivelling, and the second eccentric can be rotationally controlled by the rotation controlled second motor rotating at a speed corresponding to a frequency different from the base frequency, so as to transmit to the air flow control flap a multi-frequency swivelling control, particularly bi-frequency, with continuously variable amplitude.

Taking account of the shape of the aerodynamic profiles of the rotor blades, on the one hand, and, on the other hand, of the size of the motors useable as actuators of a rotatable trailing edge air flow control flap, and in order not to disturb too much the dynamic equilibrium of the blade, it is understood that each actuator of an actuator gear of a rotatable trailing edge air flow control flap will be to advantage housed in the part of the blade aerodynamic profile which has the greatest thickness, i.e. near the twisting axis and the pitch change axis, which extend approximately at the front quarter of the blade chord. In an advantageous way, the positioning of the actuator and, generally speaking, of the different components of the actuator gear along the blade chord allows contributing to the adjustment of the blade chord centring.

For this reason, and according to another aspect of the invention, in a rotary wing aircraft rotor blade including at least one swivelling trailing edge air flow control flap, pivoted on the blade, in a blade part near the blade trailing edge, around at least one axis directed substantially along the span of the blade and the control flap, the swivelling of the control flap being controlled by an actuator gear mounted on the blade and including at least one actuator, the actuator gear includes also, between the air flow control flap and said actuator, a transmission which, according to an advantageous embodiment of the invention, includes at least one flexible arm, integral with the air flow control flap, and the bending of which, bringing about the swivelling of the air flow control flap, is controlled by at least one lever urged on by at least one connecting rod driven in a substantially alternating movement from said actuator.

With advantage in respect of safety, the flexible arm, preferably made in the form of a flexible strip, is of sufficient appropriate stiffness to return the air flow control flap to the neutral position relative to the blade, in case of failure of the actuator gear or of stopping of the actuator(s) of the actuator gear, and/or to cushion the movements of the air flow control flap caused by an aerodynamic overload on the control flap.

In a simple structure effective and of small size embodiment, the lever rotates integrally with the flexible arm on a pin joint on the blade, around an axis substantially parallel to the air flow control flap swivelling axis, the lever being also articulated on the connecting rod, at least by pivoting around an axis substantially parallel to the flexible arm pin joint axis on the blade.

In this case, in order to compensate for the shortening of the flexible arm due to its bending, during a swivelling control of the air flow control flap, the pin joint of the flexible arm on the blade allows a small movement, substantially along the flexible arm longitudinal axis, and, with advantage, said pin joint comprises at least one elastomeric bearing, which allows this small movement, by deformation of one or more elastomer parts constituting this bearing.

In order to facilitate the setting up in the blade, the actuator gear is with advantage a modular assembly housed in a blade box and supported in this box, substantially at the level of the central part of the air flow control flap along its span, by at least one support extending with advantage substantially in the direction of the blade chord.

It is then with advantage that the support includes at least one cross member, arranged as a transverse rib, and having at least in part the shape of the blade profile, and contributing to the structural partitioning of the blade by being fixed to the suction face and pressure face skins of the blade.

BRIEF DESCRIPTION OF THE DRAWINGS

Other characteristics and advantages of the invention will emerge from the description given below, as a non-restrictive example, of a preferred embodiment described by reference to the appended drawings on which:

FIG. 2 is a transverse section of the blade of FIG. 1 and its air flow control flap and showing diagrammatically in side elevation the actuating gear, FIG. 3 is a partial diagrammatic part section and part plan of the assembly of actuators and the means of separation of the frequency control and the amplitude control of the actuator gear of FIGS. 1 and 2, and FIGS. 3a and 3b are diagrammatic side elevation views of two characteristic positions of the two eccentrics and the ring of the mechanism of FIG. 3.

DETAILED DESCRIPTION OF THE INVENTION

Figure 1:
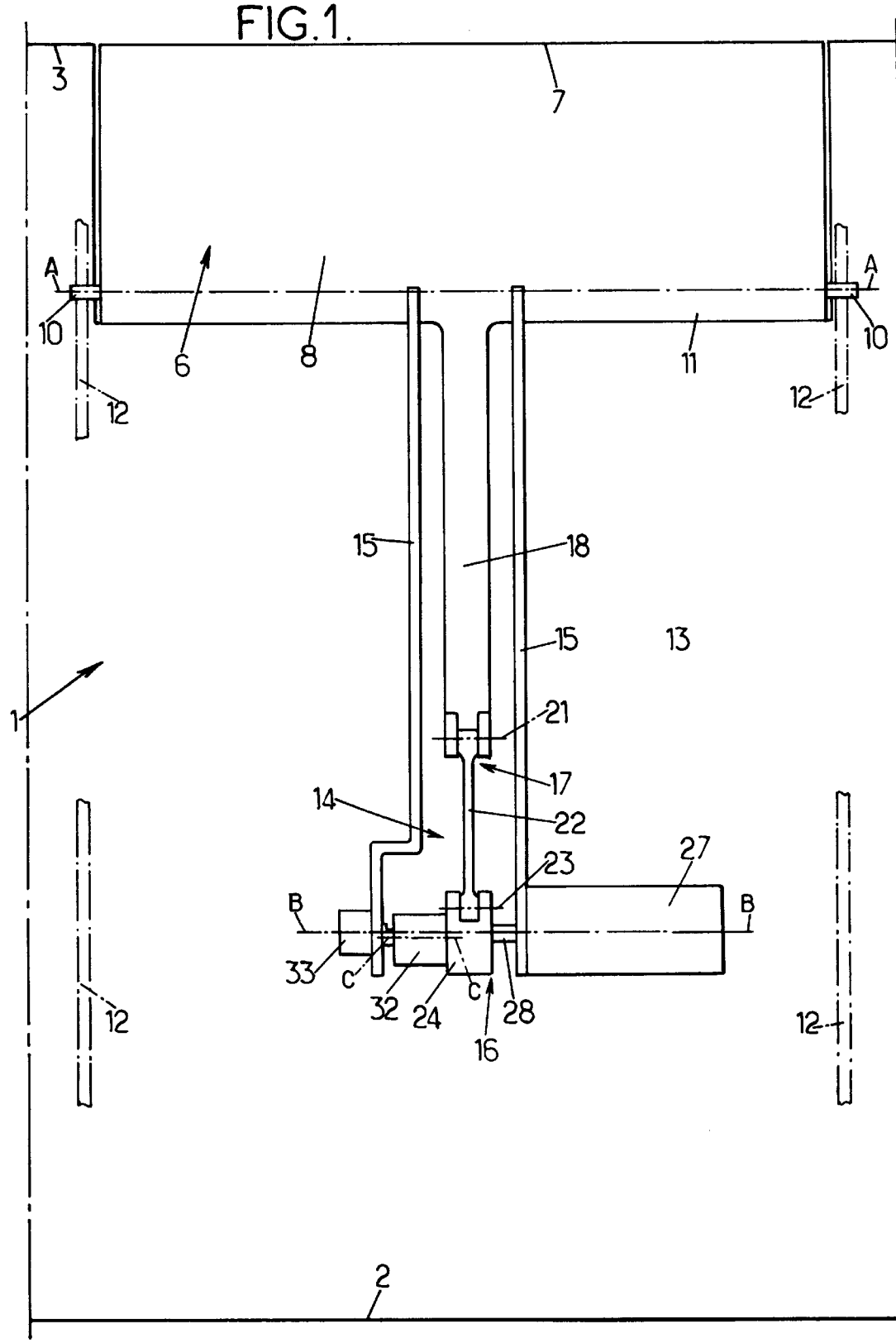
FIG. 1 is a diagrammatic plan view of a blade part incorporating an adjustable air flow control flap and its actuator gear.

FIG. 1 shows a portion of a blade 1, considered along its span, in its profiled part near to the blade tip, between its leading edge 2 and its trailing edge 3. In this portion, the profiled section of the blade 1 has an aerodynamic profile shown in FIG. 2 and delimited between the upper or suction face 4 and lower or pressure face 5 skins of the blade 1.

The blade 1 is fitted with a trailing edge air flow control flap 6, having an aerodynamic profile which is incorporated in that of the blade 1, such that in the neutral position of the control flap 6 relative to the blade 1, as shown in FIG. 2, the trailing edge 7 and the upper face 8 and lower face 9 skins of the control flap 6 extend respectively from the trailing edge 3 and the upper face 4 and lower face 5 skins of the blade 1.

The control flap 6 is pivoted on the blade 1, around a pivot axis A—A directed along the span of the blade 1 and of the control flap 6, by two pins 10 coaxial around this axis A—A and each projecting laterally towards the outside of respectively one of the two longitudinal ends of the control flap 6, in its front part 11, of greater thickness, convex and rounded around the axis A—A, and being housed in a substantially concentric concave cavity in the rear edge of the blade part 1 near the trailing edge 3 in which the control flap 6 is thus incorporated and swivelling mounted.

The pins 10 can be pivoting mounted in transverse ribs 12 of the blade 1, which are shown as a dotted line in FIG. 1, and which delimit between them a blade box designated in its entirety as 13.

The air flow control flap 6 is a rotatable or swivelling control flap, the swivelling of which relative to the blade 1, by swivelling around the axis A—A, is controlled by an actuator gear shown in its entirety as 14, made in the form of a modular device housed in the blade box 13, approximately at the level of the centre of the control flap 6, along its span. This gear 14 is mounted in the blade 1 by being supported in this box 13 by a support including two parallel cross members 15 spaced from each other, and extending approximately in the direction of the blade 1 chord, these two cross members 15 being themselves supported in the box 13 for example by fixing to two longitudinal ribs (not shown) of the blade 1 framework, which extend approximately along its span. The cross members 15 can be arranged as transverse ribs and have at least in part the shape of the blade 1 profile, and be fixed directly to the upper face 4 and lower face 5 skins of the blade 1 so as to contribute to the structural partitioning of the blade 1, approximately in the same way as the ribs 12.

The actuator gear 14 includes an actuator and separation assembly for the frequency and amplitude controls of the swivelling of the air flow control flap 6, this assembly being globally designated as 16 in FIG. 1, and housed in the thickest part of the blade profile 1, approximately at the level of the pitch or twisting axis, at the front quarter of the blade chord 1. The actuator gear 14 also includes a transmission 17, connecting the actuator and separation controls' assembly 16 to the control flap 6, for the transmission of movement to the latter.

The positioning of the assembly 16, and, more generally, all the components of the gear 14 along the blade chord 1 allows adjustment of the blade chord centring.

The assembly 16 is described below by reference more particularly to FIGS. 3, 3a and 3b.

As shown by FIGS. 1 and 2, the transmission 17 includes a flexible arm 18, made in the shape of a flexible strip, and placed between the support cross members 15, the rear end of the flexible arm 18 being integral with the front part 11 of the control flap 6, whereas the front end of the flexible arm 18 pivots on a pin joint 19 supported by the cross members 15 and with a pivoting axis substantially parallel to the swivelling axis A—A of the control flap 6.

By its front end, the flexible arm 18 is also integral with one end of a lever 20, inclined on the arm 18, and rotating integrally with it around the pin joint 19. By its opposite end, the lever 20 is pin jointed, around an axis 21 substantially parallel to the pivot axis 19, on a rear end of a connecting rod 22, the front end of which is pin jointed around an axis 23, substantially parallel to the axis 21, on a ring 24, constituting the output part of the assembly 16 described below, and which can be set in motion and move the axis 23 so that the connecting rod 22 is driven in an approximately alternating movement from the assembly 16. The connecting rod 22 thus assists the lever 20 in alternating rotations around the pivot 19, so that the lever 20 brings about bending of the flexible arm 18 alternately upwards and downwards in FIG. 2, this bending bringing about the swivelling of the air flow control flap 6 respectively downwards and upwards relative to the blade 1, because of the connection of the flexible arm 18 to the front part 11 of the control flap 6.

It is understood that the control flap 6 can thus be moved in alternating swivelling around the axis A—A by the bending of the arm 18 brought about by the alternating pivoting of the lever 20 under the action of approximately reciprocating motions of the connecting rod 22 resulting from movements of the ring 24, as described below.

It is also understood that the bending of the arm 18 tends to bring together the pivot 19, fixed to the cross members 15, with the axis A—A of the pins 10, and that this "shortening" of the arm 18 due to its bending must be compensated by a slight movement along the axis of the arm 18, at the level of the pin joint 19. This slight movement is obtained, for example, with the aid of an elastomeric bearing 25 surrounding the pivot 19 and mounted between the latter and the arms 18 and lever 20, and such that the compression deformation of one or more elastomer sleeves of this bearing 25 allow this small movement. As a variant, elastomeric bearings can be mounted around the ends of the pivot 19, at their connection to the cross members 15.

Furthermore, the flexible strip constituting the flexible arm 18 is of sufficient appropriate stiffness to return the air flow control flap 6 to the neutral position (FIG. 2) relative to the blade 1, in the absence of alternating movements of the connecting rod 22, i.e. when the actuator assembly 16 is stationary or broken. The stiffness of this flexible strip 18 is also sufficient to ensure a cushioning of the swivelling of the air flow control flap 6 caused by any aerodynamic overload on the control flap 6, such as caused for example by a gust of wind or turbulence in the ambient air.

The actuator unit 16 is now described by reference also to FIGS. 3 to 3b.

The unit 16 includes a first rotating motor 27, for example electric, which is fixed cantilevered on a cross member 15, outside the two cross members 15, and the output shaft 28 of which rotates in the cross members 15 by means of two plain 15 or rolling bearings 29.

Between the cross members 15, the output shaft 28 is surrounded by two eccentrics mounted in series, and the first of which 30, or internal eccentric, with eccentricity e1 relative to the rotational axis B—B of the shaft 28, is surrounded by the second eccentric 31, or external eccentric, of eccentricity e2 relative to the axis C—C of the first eccentric 30. The first eccentric 30 rotates integrally with the shaft 28, and is thus rotated by the motor 27 around the axis B—B with a rotational speed which corresponds to the desired frequency of swivelling of the control flap 6, in the case of mono-frequency control of the swivelling of the control flap 6.

The second eccentric 31 is centred on the axis C—C of the first eccentric 30, and its angular position around the first eccentric 30, by rotating around the axis CC, is controlled by a second rotating motor 32, which is integral with the first eccentric 30. Thus, the second motor 32 turns with the first eccentric 30 and the output shaft 28 of the first motor 27 around the rotational axis B—B of the latter, and this second rotating motor 32 can rotate the external eccentric 31 around the axis C—C of the internal eccentric 30, when instructed to do so. This second motor 32 is, for example, an electric motor, supplied with current through a rotating commutator 33, mounted around the end of the shaft 28 of the motor 27 which projects outside that cross member 15 not supporting the motor 27.

The dynamic movement of the second eccentric 31 is continued, for the control of the control flap 6 by means of the transmission 17, through the ring 24, freely rotating around the second eccentric 31 by means of a rolling bearing 34 or a plain bearing.

In the same way, the second eccentric 31 can be mounted rotating around 8 the first eccentric 30 by means of a rolling bearing 35 or a plain bearing.

The two eccentrics 30 and 31, the external ring 24, and the second motor 32, which controls the amplitude as explained below, constitute a movable coupling mounted on the two plain or rolling bearings 29, along the axis B—B of the first motor 27, the output shaft 28 of which is the axis of the movable coupling.

The second rotating motor 32 allows the angular movement of the external eccentric 31 on the internal eccentric 30 between two end positions, shown diagrammatically in FIGS. 3a and 3b respectively, the position of FIG. 3a being a position of minimum eccentricity of the mechanism, when the two eccentrics 30 and 31 are in opposition, the overall eccentricity being equal to e1−e2, and being able to be zero if e1=e2, in which case the distances a and b between the axis B—B of the motor 27 and the diametrically opposite points respectively upper and lower on the external diameter of the ring 24 are then equal. FIG. 3b shows the position of global maximum eccentricity, equal to the sum of the eccentricities e1+e2, obtained when the two eccentrics 30 and 31 are superposed to the maximum on a same side (upper in FIG. 3b) of the axis B—B, so that the distance a between this axis and the upper end of the ring 24 is greater than the distance b between this axis and the lower end of the ring 24, the eccentricity of the mechanism being equal to a−b.

It is understood that by the control of the second rotating motor 32, the mechanism can be given any desired eccentricity between the minimum eccentricity, being able to be zero, and the maximum eccentricity, which is the sum of the eccentricities of the two eccentric 30 and 31.

When the eccentricity of the mechanism is not zero and the motor 27 turns, the ring 24, due to the fact of its free rotation around the external eccentric 31, is driven in an alternating translation movement upwards and downwards in FIGS. 2, 3a and 3b, and this movement, also communicated to the pivoting axis 23 of the ring 24 on the connecting rod 22, is sufficient to drive the latter along substantially reciprocating motions the amplitude of which is a function particularly of the eccentricities e1 and e2 and of the relative position of the eccentrics 30 and 31, and determines also the pivoting amplitude of the air flow control flap 6.

The control of the pivoting amplitude of the air flow control flap 6 depends also on the control, by the rotating motor 32, of the overall eccentricity of the mechanism comprising the two eccentrics in series 30 and 31 and the ring 24. This amplitude control can thus be separated from the frequency control, ensured by the control of the rotational speed of the first motor 27 in the case of monofrequency control. In this case the rotational speed of this first motor 27 corresponds to the desired frequency of the swivelling of the air flow control flap 6 and is adjustable in a speed range corresponding to the desired range of swivelling frequencies of the control flap 6, this frequency range being able to extend from about 30 Hz to about 100 Hz for example.

In order to control the movements of the control flap 6 with an adjustable but constant amplitude, a second lockable or self-lockable rotating motor 32 can be used, while this motor 32, particularly when it is a stepper motor, can be position controlled if the movements of the air flow control flap 6 must be controlled with variable amplitude in steps when the blade 1 makes a rotor turn.

As a variant, the assembly 16 can apply a multi-frequency control, particularly bi-frequency, of the swivelling of the air flow control flap 6, with a continuously (in time) variable amplitude. This control is, for example, obtained with the gear 14 described above by driving the first eccentric 30 by the first motor 27 at a rotational speed corresponding to a base frequency $\omega o$, the movement amplitude A1 resulting from this rotation of the eccentric 30 being of the form A1=e1 sin $\omega ot$, where t is the time. The second eccentric 31 is controlled in rotation by the second motor 32 controlled in rotation, in the case of a bi-frequency control, with a speed corresponding to another frequency $\omega m$, different from $\omega o$ and preferably less than $\omega o$. In relation to the first eccentric 30, the second eccentric 31 introduces a low frequency amplitude modulation $\omega m$. The amplitude is minimum when the eccentrics 30 and 31 are in opposition (FIG. 3a), and maximum when the eccentrics 30 and 31 are superposed (FIG. 3b). This amplitude modulation is of the form A2=e2 sin $\omega mt$. The resultant amplitude A activating the control of the air flow control flap 6 is therefore A=e1 sin $\omega ot$+e2 sin $\omega mt$, which corresponds to a bi-frequency control.

FIG. 3a shows the minimum amplitude position A, which is even zero if e1=e2, whereas FIG. 3b shows the maximum amplitude position A, equal to e1+e2.

Swivelling of the active air flow control flap 6 is thus controlled in a frequency and amplitude separated way by the actuator gear 14 described above. However, this actuator gear can of course be used, during a same flight, in active or passive configuration.

What is claimed is:

1. A rotary wing aircraft rotor blade, comprising: a span, a blade trailing edge, at least one trailing edge swiveling air flow control flap, said control flap being swivelled on the blade, in a blade part near the blade trailing edge, around at least one axis directed substantially along the span of the blade and of the control flap, the swivelling of the air flow control flap being controlled by an actuator gear, mounted on the blade, and including at least one actuator wherein said actuator gear further includes means of separation of a frequency control and an amplitude control of the swivelling of the air flow control flap and two eccentrics in series, the second around the first, and the first eccentric of which is rotated by a first rotating motor around the axis of said first motor, at a rotational speed corresponding to a base frequency of the swivelling of the air flow control flap, and the second eccentric of which is centered on the axis of said first eccentric and controlled in angular position relative to said first eccentric and around the axis of said first eccentric, for the amplitude control of the swivelling of said air flow control flap, by at least one second rotating motor, rotating integrally with said first eccentric around the axis of said first motor, a ring being mounted rotating freely on said second eccentric, and connected to said air flow control flap by a transmission transforming the movements of said ring by said eccentrics in swivelling of the air flow control flap with an amplitude which is a function of the eccentricities and of the relative position of said two eccentrics and which is controlled by said second motor.

2. A blade according to claim 1, wherein a movable coupling constituted by said two eccentrics, said second motor, and said external ring, is mounted on two bearings, along the axis of said first motor.

3. A blade according to claim 1, wherein said second rotating motor is an electric motor supplied with current through a commutator rotating around an output shaft of said first motor.

4. A blade according to claim 3, wherein said second rotating motor is an electric stepper motor which is position controlled so as to control the swivelling of said air flow control flap with an amplitude variable in steps on a turn of the rotor.

5. A blade according to claim 1, wherein said second rotating motor is a lockable motor so as to control the swivelling of said air flow control flap with constant amplitude.

6. A blade according to claim 1, wherein said first motor drives said first eccentric with a rotational speed corresponding to said base frequency of the swivelling of said air flow control flap, and said second eccentric is rotation controlled by said second motor which is controlled to rotate at a speed corresponding to a different frequency to the base frequency, so as to transmit to said air flow control flap a multi-frequency swivelling control with continuous variable amplitude.

7. A blade according to claim 1, wherein said blade has a blade cord, said actuator gear is a modular assembly housed in a blade box and supported in said box, substantially at the level of the central part of said airflow control flap along its span, by at least one support extending substantially in the direction of the blade cord.

8. A blade according to claim 7, wherein said support includes at least one cross member having at least in part the shape of the blade profile and contributing to the structural partitioning of the blade by being fixed to upper face and lower face skins of the blade.

9. A rotary wing aircraft rotor blade, comprising: a span, a blade trailing edge, at least one trailing edge swivelling air flow control flap, said control flap being swivelled on the blade, in a blade part near the blade trailing edge, around at least one axis directed substantially along the span of the blade and of the air flow control flap, the swivelling of the air flow control flap being controlled by an actuator gear, mounted on the blade, and including at least one actuator, wherein said actuator gear also includes, between said air flow control flap and said actuator, a transmission which includes at least one flexible arm, integral with said control flap, said flexible arm is of sufficient appropriate stiffness to return said air flow control flap to a neutral position relative to the blade, in case of failure of the actuator gear or the stopping of said actuator of the actuator gear, and the bending of which, driving the swivelling of said control flap, is controlled by at least one lever urged on by at least one connecting rod driven in a substantially alternating movement from said actuator.

10. A blade according to claim 9, wherein said actuator includes at least a first rotating motor, turning at a rotational speed corresponding to a desired frequency of swivelling of the air flow control flap, in case of a mono-frequency control.

11. A blade according to claim 10, wherein said first rotating motor turns at an adjustable rotational speed in a speed range corresponding to a frequency range of the swivelling of the air flow control flap.

12. A blade according to claim 9, wherein said flexible arm is of sufficient appropriate stiffness to cushion the movements of the air flow control flap caused by an aerodynamic overload on the air flow control flap.

13. A blade according to claim 9, wherein said flexible arm is in the shape of a flexible strip.

14. A blade according to claim 9, wherein said lever rotates integrally with said flexible arm on a pin joint on the blade, around an axis substantially parallel to the pivoting axis of said air flow control flap, said lever being also articulated on said connecting rod, at least so as to pivot around an axis substantially parallel to the axis of said pin joint.

15. A blade according to claim 14, wherein said pin joint enables a small movement substantially along the longitudinal axis of said flexible arm, so as to compensate for the shortening of the flexible arm due to its bending.

16. A blade according to claim 15, wherein said pin joint comprises at least one elastomeric bearing enabling said movement.

17. A blade according to claim 9, wherein said blade has a blade cord, said actuator gear is a modular assembly housed in a blade box and supported in said box, substantially at the level of the central part of said airflow control flap along its span, by at least one support extending substantially in the direction of the blade cord.

18. A blade according to claim 17, wherein said support includes at least one cross member having at least in part the shape of the blade profile and contributing to the structural partitioning of the blade by being fixed to upper face and lower face skins of the blade.

* * * * *